United States Patent
Nakajima et al.

(10) Patent No.: US 7,394,668 B2
(45) Date of Patent: Jul. 1, 2008

(54) SWITCHING POWER SUPPLY CIRCUIT AND FREQUENCY CONVERTER

(75) Inventors: Tooru Nakajima, Narashino (JP); Masahiro Hiraga, Yotsukaido (JP); Tetsuya Kimura, Chiba (JP); Satoshi Ibori, Yachimata (JP); Masayuki Hirota, Narashino (JP)

(73) Assignee: Hitachi Industrial Equipment Systems Co., Ltd., Chiba (JP)

( * ) Notice: Subject to any disclaimer, the term of this patent is extended or adjusted under 35 U.S.C. 154(b) by 0 days.

(21) Appl. No.: 11/599,220

(22) Filed: Nov. 13, 2006

(65) Prior Publication Data

US 2007/0058400 A1    Mar. 15, 2007

Related U.S. Application Data

(63) Continuation of application No. 10/444,762, filed on May 22, 2003, now Pat. No. 7,151,680.

(30) Foreign Application Priority Data

May 22, 2002    (JP)    ............................. 2002-147057

(51) Int. Cl.
*H09M 3/335*    (2006.01)
(52) U.S. Cl. ............... 363/21.04; 363/21.09; 363/21.12; 363/21.18
(58) Field of Classification Search ............ 363/21.04, 363/21.09, 21.1, 21.11, 21.12, 21.17, 21.18
See application file for complete search history.

(56) References Cited

U.S. PATENT DOCUMENTS

| 4,028,596 | A | 6/1977 | Weber |
|---|---|---|---|
| 4,642,744 | A | 2/1987 | Thomas |
| 4,988,922 | A | 1/1991 | Shoda et al. |
| 5,003,454 | A | 3/1991 | Bruning |
| 5,043,598 | A | 8/1991 | Maeda et al. |
| 5,115,168 | A | 5/1992 | Shoda et al. |
| 5,282,126 | A | 1/1994 | Husgen |
| 5,644,214 | A | 7/1997 | Lee |
| 5,953,219 | A | 9/1999 | Matsumoto |
| 6,496,389 | B1 | 12/2002 | Yasumura |

FOREIGN PATENT DOCUMENTS

| DE | 4029057 | 3/1992 |
|---|---|---|
| JP | 55-127884 | 10/1980 |

(Continued)

*Primary Examiner*—Bao Q Vu
(74) *Attorney, Agent, or Firm*—Townsend and Townsend and Crew LLP (57) ABSTRACT

An object of the present invention is to lower the voltage applied to the starting resistor of the starting circuit in a switching power supply circuit to reduce the power loss especially when the receiving voltage is high and thereby provide a small and inexpensive switching power supply circuit.

According to the present invention, a switching power supply circuit comprises: a DC voltage section having two or more capacitors connected in series; and a PWM control circuit for receiving DC power supply from the DC voltage section and performing switching control on a primary side of a transformer in order for the switching power supply circuit to output a DC voltage of different voltage specifications; wherein the starting resistor for the PWM control circuit is connected to a connection point of the capacitors.

16 Claims, 4 Drawing Sheets

FOREIGN PATENT DOCUMENTS

| | | |
|---|---|---|
| JP | 61-026496 A | 2/1986 |
| JP | 63-240371 | 10/1988 |
| JP | 02-070268 A | 3/1990 |
| JP | 05-064461 A | 3/1993 |
| JP | 05-207734 A | 8/1993 |
| JP | 07-231675 | 8/1995 |
| JP | 11-018421 | 1/1999 |
| JP | 2000-060118 | 2/2000 |
| JP | 2000-262057 | 9/2000 |
| SU | 1282298 | 10/1988 |
| WO | WO 03/030342 | 4/2003 |

SWITCHING POWER SUPPLY CIRCUIT AND FREQUENCY CONVERTER

BACKGROUND OF THE INVENTION

The present invention relates to a device whose DC voltage section has two or more capacitors connected in series, and more particularly to a circuit configuration of a switching power supply circuit whose DC voltage section supplies a DC voltage of different voltage specifications.

Figure 6:
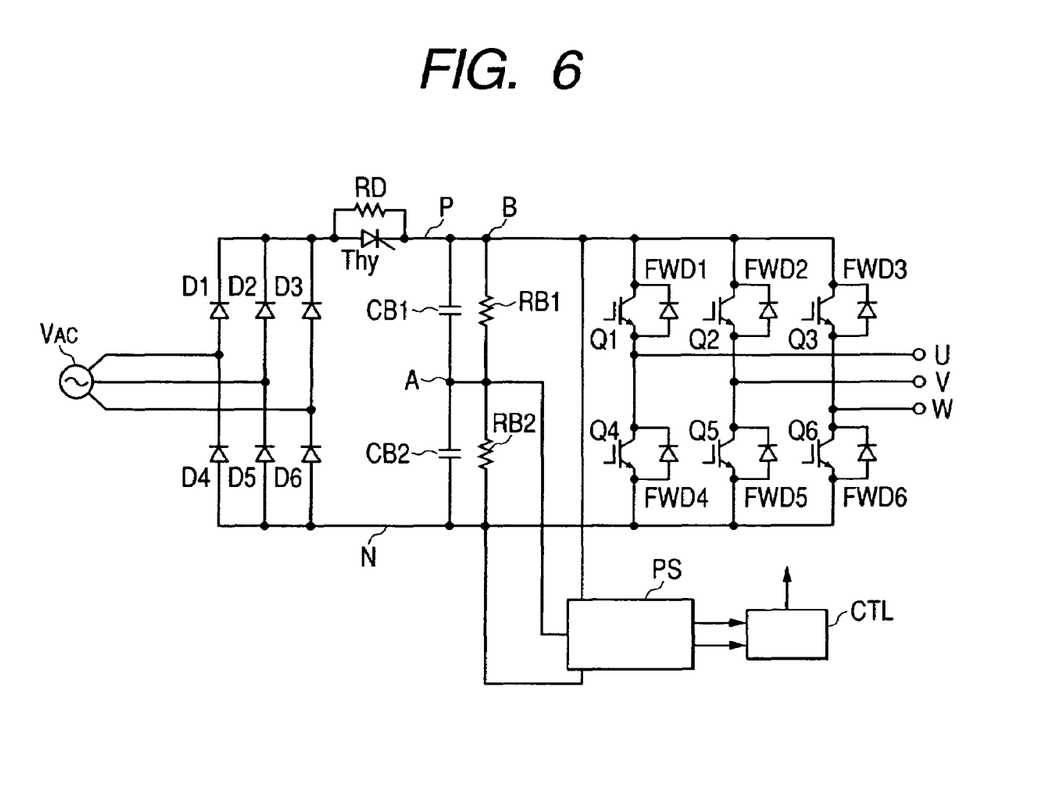
FIG. 6 is a diagram showing a power supply circuit for a frequency converter according to an embodiment of the present invention.

A related prior art technique disclosed in, for example, FIG. 6 of Japanese Laid-Open Patent Publication No. 2000-60118 provides a switching power supply circuit which converts received AC power to a DC voltage and, from this converted DC voltage, produces a DC voltage of different voltage specifications. Specifically, this switching power supply circuit receives DC power from its DC voltage section and performs switching control on the primary side of the transformer by use of a PWM control circuit to output a DC voltage of different voltage specifications. The switching power supply circuit, however, is disadvantageous in that the voltage of its DC voltage section increases with increasing voltage of the received AC power (for example, such high receiving voltages as 200 V and 400 V). This means that the power loss produced in resistors 8 and 9 used in the starting circuit of the switching power supply circuit increases substantially in proportion to the square of the increase in the receiving voltage. To solve the above problems, the invention disclosed in Japanese Laid-Open Patent Publication No. 2000-60118 provides a method in which power is supplied to a power control IC used as the above PWM control circuit through a resistor only when the switching power supply circuit is started. The current flowing through the resistor is cut off after the switching power supply circuit has begun to operate. In this arrangement, however, the circuit for performing the cutoff control on the current must employ an active device which has a withstand voltage matching the voltage of the DC voltage section, resulting in a complicated circuit and increased cost.

Other methods have been also used to solve the above problems, as described in FIG. 6 of the above Japanese Laid-Open Patent Publication No. 2000-60118. Specifically, two or more resistors connected in series are installed in the starting circuit to divide the voltage; the dimensions of the resistor itself are increased to dissipate the heat produced in the resistor; the number of resistors connected in series is increased even when the voltage of each resistor does not exceed the maximum permissible voltage in order to spread the heat generation sources (resistors) in a wider area; or a sufficient heat dissipation space is provided around the resistor.

In the above switching power supply circuits, however, the voltage applied to the resistor of the starting circuit increases with increasing voltage Vi of the DC voltage section, causing the problems described in paragraphs (1) to (3) below.

(1) If the voltage or power to be applied to the resistor of the starting circuit exceeds its maximum permissible value, the resistor must be replaced by two or more resistors connected in series. The higher the voltage, the larger the number of the series-connected resistors, which is a factor in reducing the reliability and increasing the cost.

(2) Furthermore, the heat generated in the resistor due to the power loss increases with increasing voltage applied to the resistor, making it necessary to provide a sufficient heat dissipation space. This is a factor in increasing the equipment size and the cost.

(3) As for the related prior art technique of the invention disclosed in Japanese Laid-Open Patent Publication No. 2000-60118 which solves the above problems, it is disadvantageous in that the circuit for performing cutoff control on the current must employ an active device which has a withstand voltage matching the voltage of the DC voltage section. This means that an active device of high withstand voltage is required when the receiving voltage is high, which leads to an increase in the circuit complexity and the cost.

It is, therefore, an object of the present invention to provide a small and inexpensive switching power supply circuit with a simple circuit configuration which lowers the voltage applied to a resistor of its starting circuit to reduce the power loss, especially when the receiving voltage is high.

SUMMARY OF THE INVENTION

To solve the above problems, the present invention utilizes the fact that with a high receiving voltage, it is necessary to install two or more series-connected smoothing capacitors in the DC voltage section, instead of just one smoothing capacitor. Specifically, according to the present invention, a switching power supply circuit comprises: a DC power supply section having two or more capacitors connected in series; and a PWM control circuit for receiving DC power supply from the DC voltage section and performing switching control on a primary side of a transformer in order for the switching power supply circuit to output a DC voltage of different voltage specifications; wherein a DC voltage of the DC voltage section is divided, and a power supply to the PWM control circuit is connected through a resistor to a dividing point of the voltage division. This arrangement reduces the power loss produced in the resistor for the above starting circuit as well as the size and cost.

DETAILED DESCRIPTION OF THE PREFERRED EMBODIMENTS

Figure 1:
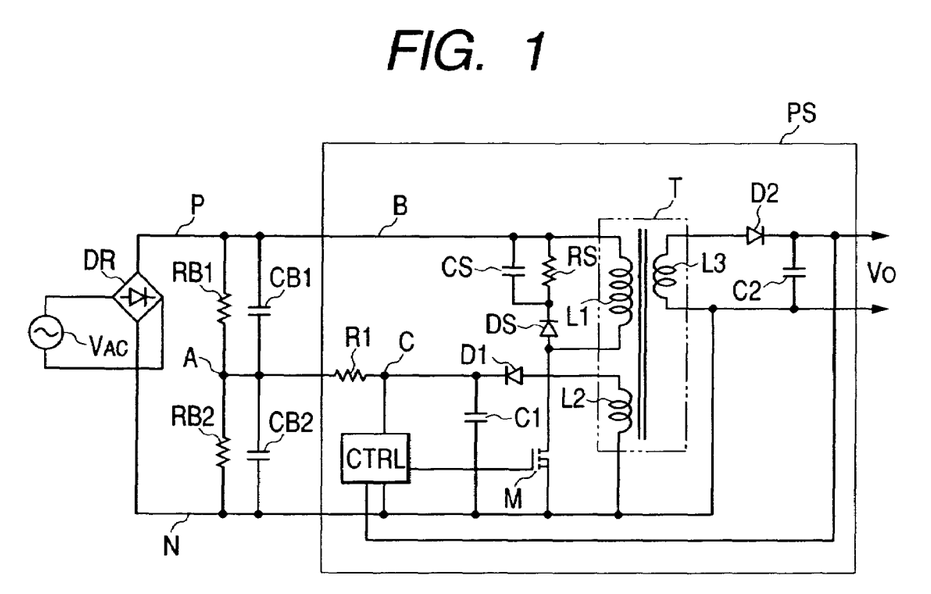
FIG. 1 is a diagram showing the configuration of a switching power supply according to an embodiment of the present invention.

Detailed description will be made below of the circuit configurations of switching power supply circuits according to preferred embodiments of the present invention with reference to the accompanying drawings. FIG. 1 shows a switching power supply circuit according to an embodiment of the present invention. Referring to FIG. 1, reference numeral DR denotes a rectifying diode for rectifying AC power $V_{AC}$ to produce a DC voltage. Reference numerals CB1 and CB2 denote capacitors for smoothing the DC voltage produced by the rectifying diode DR. Reference numerals RB1 and RB2 denote voltage balancing resistors for equalizing the voltages applied to the capacitors CB1 and CB2. Reference numeral A denotes a connection point at which the capacitors CB1 and CB2 as well as the resistors RB1 and RB2 are connected in series. Reference numeral B indicates a portion (point) at which the DC voltage Vi smoothed by the capacitors CB1 and CB2 appears. Reference numeral CTRL denotes a PWM control circuit for performing PWM control on the primary side of the transformer of the switching power supply circuit. Specifically, the PWM control circuit is made up of a power control IC which outputs a PWM control signal. For example, an IC such as HA16107FP available from Hitachi, Ltd. is used. Reference numeral C indicates a terminal used for supplying necessary power to the PWM control circuit CTRL. Reference numeral M denotes a switching device. Reference numerals CS, DS, and RS denote a snubber capacitor, a snubber diode, and a snubber resistor for surge voltage absorption, respectively. Reference numeral R1 denotes a resistor of the starting circuit used for supplying power to the PWM control circuit CTRL during and after the startup of the switching power supply circuit. Even though FIG. 1 shows only one resistor R1, a plurality of resistors may be connected in series and the number of the series-connected resistors may be adjusted as necessary. Reference numerals D1, D2, C1, and C2 denote diodes and smoothing capacitors, respectively. In the rectifier system with the rectifying diode DR shown in FIG. 1, a single-phase current is rectified by a bridge circuit. However, the present invention is not limited to a particular type of rectifier system.

Figure 2:
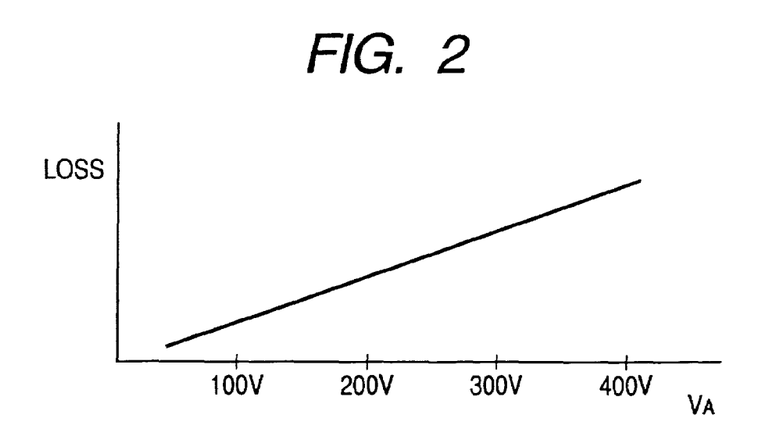
FIG. 2 is a diagram showing the power loss characteristic of a starting circuit according to the present invention.

The present embodiment of the invention connects the resistor R1 to the point A, whereas the related prior art technique connects the resistor R1 of the starting circuit to the point (portion) B located at a position after the smoothing capacitors CB1 and CB2. According to the present embodiment, the voltage $V_A$ at the point A is lower than the voltage Vi at the point B, making it possible to reduce the voltage applied to the resistor R1 and thereby lower the loss produced in the resistor R1. Furthermore, it is possible to reduce the number of series-connected resistors and thereby reduce the heat dissipation space. As a result, the reliability can be enhanced. FIG. 2 shows the relationship between the voltage $V_A$ at the voltage dividing point A and the power loss produced in the resistor R1, assuming that the PWM control circuit CTRL requires substantially an equal current for all values of the voltage $V_A$. The figure indicates that the power loss produced in the resistor R1 can be reduced substantially in proportion to the decrease in the voltage at the dividing point A. Specifically, the resistor R1 receives the DC voltage $V_A$ at the voltage dividing point A minus the voltage $V_{CTRL}$ applied to the PWM control circuit CTRL. In most cases, the voltage applied to the PWM control circuit CTRL is substantially constant and ten-odd volts or less. Furthermore, the operational current required for the PWM control circuit CTRL is also substantially constant. Therefore, when power is supplied to the PWM control circuit with the resistor R1 connected to the voltage dividing point A, the power loss can be reduced substantially in proportion to the decrease in the voltage at the voltage dividing point A.

Consider, by way of example, that the voltages applied to the capacitors CB1 and CB2 are made equal to each other and thereby the voltage $V_A$ at the voltage dividing point A is set equal to half of the voltage Vi at the point B. In such a case, the voltage applied to the resistor R1 is substantially half of that for the related prior art technique. At that time, the values of the resistors RB1, RB2, and R1 are set such that $V_A=Vi/2$ based on Formula 1 described later.

In this case, if a current is drawn to the starting circuit from the voltage dividing point A at which the capacitors CB1 and CB2 are connected in series as shown in FIG. 1, the voltages of the capacitors CB1 and CB2 become unbalanced since the values of the balancing resistances connected in parallel to the capacitors are not equal. Therefore, the combined impedances must be set so as to balance the voltages.

Figure 3:
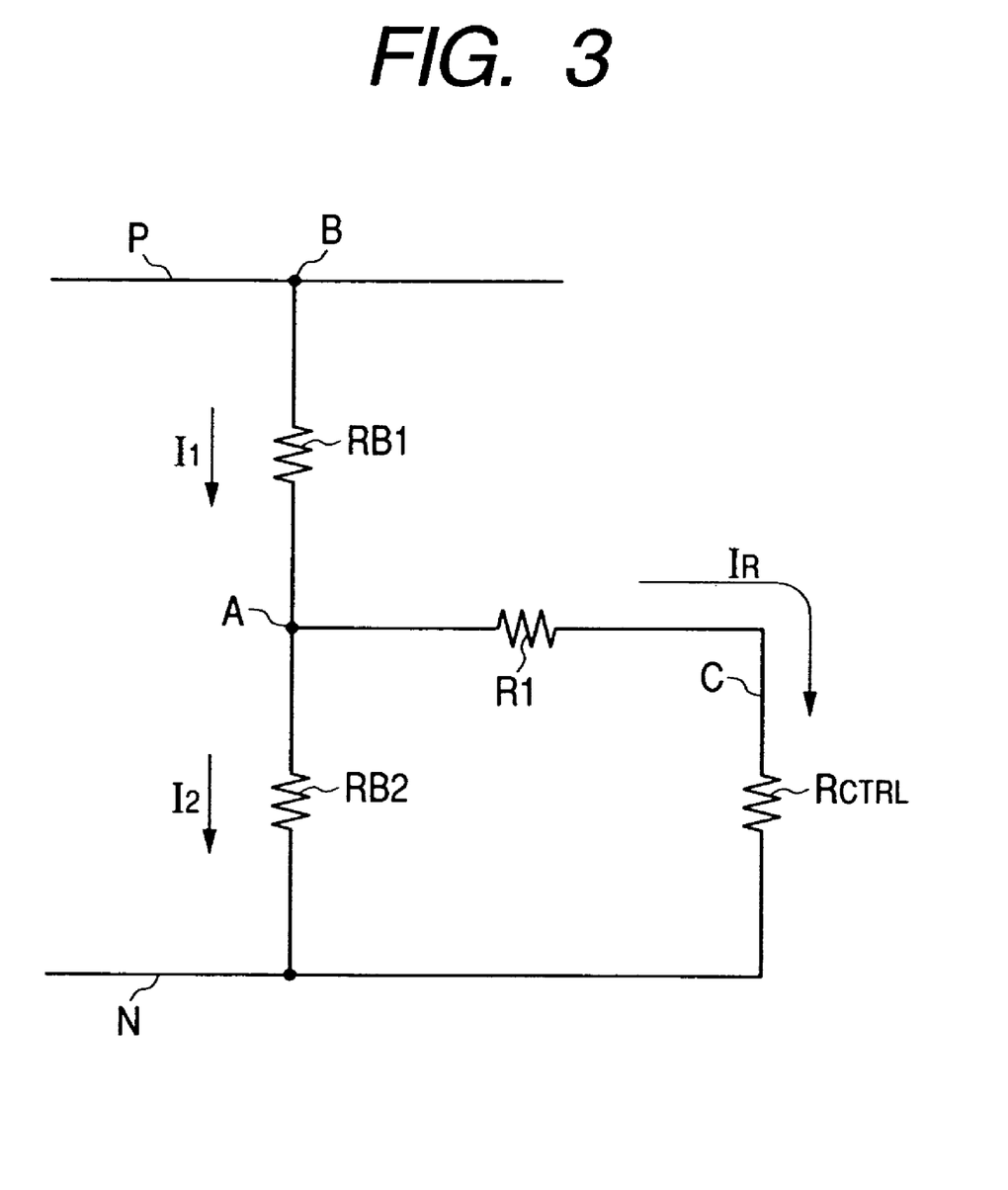
FIG. 3 is a diagram showing an equivalent circuit for illustrating an embodiment of the present invention.

FIG. 3 shows an equivalent circuit of the portion of the switching power supply circuit in FIG. 1 which consists of the resistors RB1 and RB2, the capacitors CB1 and CB2, and the input impedance $R_{CTRL}$ of the PWM control circuit CTRL. Let $V_A$ denote the voltage at the voltage dividing point A at which the capacitors are connected in series and Vi the voltage at the point B in the DC voltage section. The current I1 flowing through the resistor RB1 is the sum of the current I2 in the resistor RB2 and the current $I_R$ in the resistor R1. The voltage $V_A$ at the voltage dividing point A is determined by the voltage drop across the resistor RB1, while the values of I2 and $I_R$ are determined by the voltage $V_A$ at the voltage dividing point A and the values of the resistors RB2, R1, and $R_{CTRL}$. The following formula (Formula 1) is derived from the above relations.

$$V_A = \frac{1}{1 + RB1\dfrac{RB2 + R1 + R_{CTRL}}{RB2(R1 + R_{CTRL})}} Vi \quad \text{(Formula 1)}$$

Based on Formula 1, the values of the resistors RB1, RB2, and R1 are determined such that the voltage $V_A$ at the voltage dividing point A is set to a desired value. It should be noted that the value of $R_{CTRL}$ is determined based on the specifications of the PWM control circuit, separately. Furthermore, the relation $V_C < V_A < Vi$ must hold.

As described above, the resistor R1, and the resistors RB1 and RB2 connected in parallel with the capacitors CB1 and CB2 can be set to appropriate values to stably set the voltages of the capacitors CB1 and CB2 to arbitrary values. Thus, the voltages applied to the capacitors CB1 and CB2 can be set to arbitrary values and balanced. Furthermore, the power supplied to the control circuit CTRL from the voltage dividing point A at which the capacitors CB1 and CB2 are connected to each other is set smaller than that for the related prior art technique.

Figure 4:
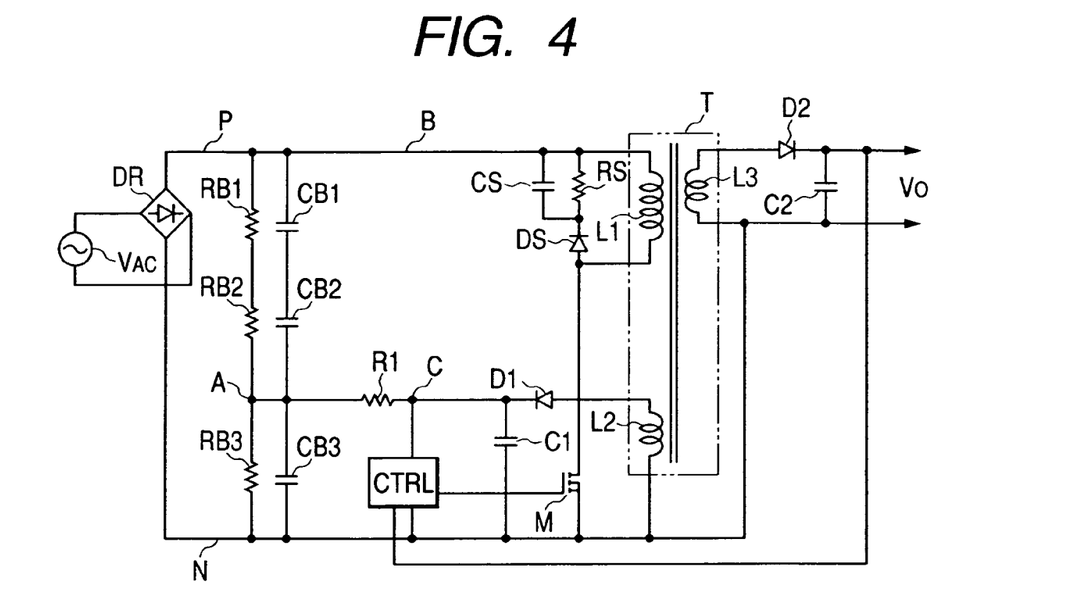
FIG. 4 is a diagram showing the circuit configuration of a switching power supply according to an embodiment of the present invention.

FIG. 4 shows a switching power supply circuit according to another embodiment of the present invention, wherein three capacitors are connected in series. Referring to FIG. 4, reference numerals CB1, CB2, and CB3 denote capacitors, while reference numerals RB1, RB2, and RB3 denote resistors connected in parallel to the capacitors. In FIG. 4, the resistor R1 is connected to the connection point at which the capacitors CB2 and CB3 are connected in series. For example, the voltages applied to the capacitors CB1, CB2, and CB3 can be balanced by setting the values of the resistors RB1, RB2, RB3, and R1 such that they satisfy the following formula (Formula 2).

$$V_A = \frac{1}{1 + (RB1 + RB2)\dfrac{RB3 + R1 + R_{CTRL}}{RB3(R1 + R_{CTRL})}} V_i \quad \text{(Formula 2)}$$

In this case, if the value of the resistor RB1 is set equal to that of the resistor RB2, the voltage $V_A$ at the voltage dividing point A shown in FIG. 4 is equal to one-third of the voltage Vi at the point B shown in FIG. 4. Even though FIG. 4 shows an example using 3 capacitors, the present embodiment is not limited to the number of series-connected capacitors. The function-of the present embodiment can be also realized by use of 4 or more capacitors.

FIGS. 1 and 4 show circuit configurations of the so-called flyback converter. However, the present embodiment is not limited to a particular type of switching power supply circuit system. For example, it may be applied to a forward converter or a half-bridge or full-bridge.

Figure 5:
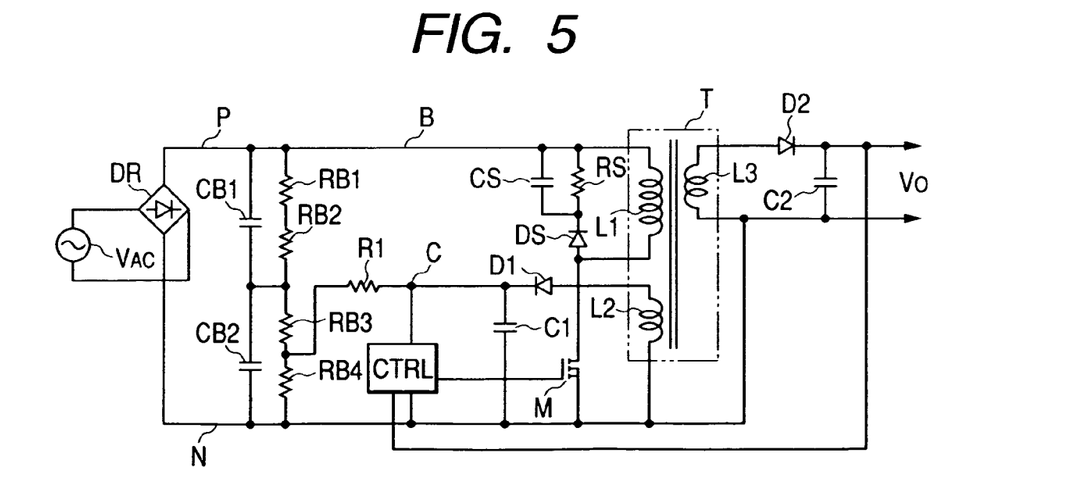
FIG. 5 is a diagram showing the circuit configuration of a switching power supply according to an embodiment of the present invention.

FIG. 5 shows a switching power supply circuit according to still another embodiment of the present invention, wherein capacitors CB1 and CB2 are connected in series and two resistors RB1 and RB2 or RB3 and RB4 are connected to each capacitor. As shown in FIG. 5, a resistor R1 is connected to the connection point at which the resistors RB3 and RB4 are connected in series. The arrangement shown in FIG. 5 makes it possible to further reduce the voltage applied to the resistor R1. Even though FIG. 5 shows an example in which two resistors are connected in parallel to each of the capacitors CB1 and CB2, the present embodiment is not limited to the number of such resistors (for example, 3 or more resistors may be connected). Furthermore, an equal number of resistors need not be connected to each of the capacitors CB1 and CB2.

FIG. 6 shows an example in which electrical equipment incorporates a switching power supply using a power supply system according to an embodiment of the present invention; specifically the switching power supply is used in a frequency converter. In FIG. 6, reference numerals D1 to D6 denote rectifying diodes for three-phase current which collectively constitute a rectifier (converter section) for receiving an AC current from an AC power supply $V_{AC}$ and converting it to a DC voltage. Reference numerals Q1 to Q6 denote inverter switching devices. Power transistors such as IGBTs or bipolar transistors are used as the inverter switching devices. Reference numerals FWD1 to FWD6 denote inverter flywheeling diodes constituting the inverter section for converting a DC intermediate voltage (P-N DC voltage) to a three-phase AC voltage whose amplitude and frequency can be arbitrarily changed. The inverter (or frequency converter) of the present embodiment shown in FIG. 6 has at least the above inverter section or converter section. It should be noted that the example shown in FIG. 6 is configured such that the output (voltage) of the converter section is used as the DC intermediate voltage (P-N DC voltage). However, the present embodiment is not limited to the above configuration in which the inverter has a converter section therein. Therefore, for example, the inverter may be configured such that it has no converter section and a DC intermediate voltage (P-N DC voltage) is supplied from an external power supply.

A thyristor Thy and a resistor RD collectively constitute an inrush current blocking circuit to the capacitors C1 and C2. In FIG. 6, reference numerals CB1 and CB2 denote smoothing capacitors in the DC intermediate voltage section of the frequency converter. In the example of FIG. 6, the two capacitors CB1 and CB2 are connected in series and voltage balancing resistors RB1 and RB2 are connected in parallel to the capacitors CB1 and CB2. The (power supply) PS shown in FIG. 6 is the same as that shown in FIG. 1 and is made up of a PWM control circuit CTRL, a switching device M, a transformer T, etc. (constituting a switching power supply circuit). The power supply PS is used as a control source for supplying a control voltage to the inverter control circuit CTRL of this frequency converter. In FIG. 6, a resistor R1 is connected to the connection point A at which the capacitors CB1 and CB2 are connected in series, as in FIG. 1. Furthermore, the primary winding L1 of the transformer is connected to the point P on the positive side of the DC voltage in FIG. 6 (for the power supply PS, the point P corresponds to the point B in FIG. 1). The point N on the negative side in FIG. 6, on the other hand, is connected to a common potential for the PWM control circuit CTRL and the switching device M.

In the above embodiments, the values of the resistors (impedance values) connected in parallel to the capacitors CB1 and CB2 are set such that the voltages applied to the capacitors are equalized. This arrangement is effective in efficiently using the capacities of the capacitors CB1 and CB2 since capacitors of the same rated voltage are usually used as the capacitors CB1 and CB2. Further, consider the case where with a high receiving voltage, the voltages applied to the capacitors exceed their withstand voltages or a certain margin must be provided for these voltages. In such a case, it is necessary to install two or more capacitors connected in series. The embodiments of the present invention utilize this series-connection arrangement to reduce the power loss produced in the starting resistor. Therefore, it is not necessary to prepare a special capacitor for startup, resulting in a simple configuration and low cost.

The present invention can lower the voltage applied to the resistor for supplying power to a switching power supply and thereby reduce the power loss, resulting in a reduced amount of generated heat. Furthermore, the present invention makes it possible to miniaturize the device and reduce the cost.

What is claimed is:

1. A frequency converter comprising:
a rectifier for receiving an AC voltage;
a first smoothing capacitance having a first terminal connected with a first output terminal of the rectifier, wherein $V_i$ is a voltage at the first terminal of the first smoothing capacitance;
a second smoothing capacitance having a first terminal connected with a second output terminal of the rectifier, wherein a second terminal of the first smoothing capacitance is connected with a second terminal of the second smoothing capacitance, wherein $V_A$ is a voltage at the second terminals of the first smoothing capacitance and the second smoothing capacitance, and wherein $V_A$ is a lower voltage than $V_i$;
a first resistance R1 connected in parallel with the first smoothing capacitance;
a second resistance R2 connected in parallel with the second smoothing capacitance;
a transformer having a first terminal of a primary winding connected with the first terminal of the first smoothing capacitance;
a PWM control circuit having a DC power supply input, wherein the PWM control circuit performs switching control of a switch connected with a second terminal of the primary winding of the transformer;
a third resistance R3 having a first terminal connected with the second terminals of the first smoothing capacitance and the second smoothing capacitance and having a second terminal connected with the DC power supply input of the PWM control circuit;
an inverter switching device comprising a power transistor and connected with the first terminals of the first smoothing capacitance and the second smoothing capacitance; and
an inverter control circuit which controls the inverter switching device.

2. The frequency converter according to claim 1, wherein the first terminal of the first smoothing capacitance is directly connected to the primary winding of the transformer.

3. The frequency converter according to claim 1, wherein, the first resistance comprises a first resistor and second resistor.

4. The frequency converter according to claim 1, wherein the first smoothing capacitance comprises a first capacitor and a second capacitor.

5. The frequency converter according to claim 1, wherein the voltages across the first smoothing capacitance and the second smoothing capacitance are substantially equal.

6. The frequency converter according to claim 1, wherein the voltage $V_A$ at the second terminals of the first smoothing capacitance and the second smoothing capacitance is set at a specified value by selecting values of the first, second, and third resistances.

7. The frequency converter according to claim 6, wherein the selecting values of the first, second, and third resistances is made according to the formula $$V_A = [1 + R1 \times (R2 + R3 + R_{CTRL}) / \{R2 \times (R3 + R_{CTRL})\}]^{-1} \times V_i,$$

wherein $R_{CTRL}$ is a resistance of the PWM control circuit.

8. The frequency converter according to claim 7, wherein the resistance of the circuit consisting of R2, R3, and $R_{CTRL}$ is substantially equal to the first resistance R1.

9. The frequency converter according to claim 1, further comprising:
   a tertiary winding of the transformer that is connected with the DC power supply input; and
   a third smoothing capacitance connected in parallel with the tertiary winding.

10. A frequency converter comprising:
    a rectifier for receiving an AC voltage;
    a first smoothing capacitance having a first terminal connected with a first output terminal of the rectifier, wherein $V_i$ is a voltage at the first terminal of the first smoothing capacitance;
    a second smoothing capacitance having a first terminal connected with a second output terminal of the rectifier, wherein a second terminal of the first smoothing capacitance is connected with a second terminal of the second smoothing capacitance, wherein $V_A$ is a voltage at the second terminals of the first smoothing capacitance and the second smoothing capacitance, and wherein $V_A$ is a lower voltage than $V_i$;
    a first resistance R1 connected in parallel with the first smoothing capacitance;
    a second resistance R2 connected in parallel with the second smoothing capacitance, wherein the second resistance R2 includes a plurality of resistors connected in series;
    a PWM control circuit having a DC power supply input, wherein the PWM control circuit performs switching control on a primary winding of a transformer;
    a third resistance R3 having a first terminal connected with a junction between two of the plurality of resistors of the second resistance R2 and having a second terminal connected with the DC power supply input of the PWM control circuit;
    an inverter switching device comprising a power transistor and connected with the first terminals of the first smoothing capacitance and the second smoothing capacitance; and
    an inverter control circuit which controls the inverter switching device.

11. The frequency converter according to claim 10, wherein the first terminal of the second smoothing capacitance is directly connected to the primary winding of the transformer.

12. The frequency converter according to claim 10, wherein the first terminal of the first smoothing capacitance is connected with the primary winding of the transformer.

13. The frequency converter according to claim 10, wherein the first smoothing capacitance comprises a first capacitor and a second capacitor.

14. The frequency converter according to claim 10, wherein the voltages across the first and second capacitances are substantially equal.

15. The frequency converter according to claim 10, wherein the voltage $V_A$ at the second terminals of the first smoothing capacitance and the second smoothing capacitance is set at a specified value by selecting values of the resistances.

16. The frequency converter according to claim 10, further comprising:
    a tertiary winding of the transformer that is connected with the DC power supply input; and
    a third smoothing capacitance connected in parallel with the tertiary winding.

* * * * *

UNITED STATES PATENT AND TRADEMARK OFFICE
CERTIFICATE OF CORRECTION

PATENT NO. : 7,394,668 B2 Page 1 of 1
APPLICATION NO. : 11/599220
DATED : July 1, 2008
INVENTOR(S) : Nakajima et al.

It is certified that error appears in the above-identified patent and that said Letters Patent is hereby corrected as shown below:

Title Page:

On the Title page, at (45),

"Jul. 1, 2008"

Should read,

--*Jul. 1, 2008--

Signed and Sealed this

Twenty-third Day of December, 2008

JON W. DUDAS
*Director of the United States Patent and Trademark Office*